United States Patent
Kirchner et al.

(10) Patent No.: US 7,579,562 B2
(45) Date of Patent: Aug. 25, 2009

(54) OPERATING ELEMENT WITH WAKE-UP FUNCTIONALITY

(75) Inventors: Sandro Kirchner, Burkardroth (DE); Anton Ruettiger, Wildflecken (DE); Oliver Katzenberger, Burglauer (DE); Thomas Noeth, Bad Neustadt (DE)

(73) Assignee: PREH GmbH, Bad Neustadt/Saale (DE)

( * ) Notice: Subject to any disclaimer, the term of this patent is extended or adjusted under 35 U.S.C. 154(b) by 0 days.

(21) Appl. No.: 12/018,167

(22) Filed: Jan. 22, 2008

(65) Prior Publication Data

US 2008/0202903 A1  Aug. 28, 2008

Related U.S. Application Data

(63) Continuation of application No. PCT/EP2006/007046, filed on Jul. 18, 2006.

(30) Foreign Application Priority Data

Jul. 21, 2005 (DE) .................... 10 2005 033 984
Nov. 21, 2005 (DE) .................... 10 2005 055 305

(51) Int. Cl.
*H01H 15/00* (2006.01)

(52) U.S. Cl. .................... 200/16 A; 200/5 R

(58) Field of Classification Search ... 200/61.54–61.57, 200/1 R, 5 R, 61.35, 61.3; 439/15, 164
See application file for complete search history.

(56) References Cited

U.S. PATENT DOCUMENTS

| 4,315,117 | A | * | 2/1982 | Kokubu et al. | ........... 200/61.27 |
|---|---|---|---|---|---|
| 4,894,492 | A | * | 1/1990 | Palumbo | ..................... 200/1 V |
| 5,719,364 | A | * | 2/1998 | Vaccari | ..................... 200/61.27 |
| 6,388,221 | B1 | * | 5/2002 | Rudolph et al. | ............. 200/556 |
| 6,864,442 | B1 | * | 3/2005 | Zegula et al. | ............ 200/11 DA |
| 6,878,886 | B1 | * | 4/2005 | Mange et al. | ................. 200/5 R |
| 6,921,872 | B2 | * | 7/2005 | Rudolph et al. | .......... 200/61.54 |
| 7,060,915 | B2 | * | 6/2006 | Bricaud et al. | ............. 200/5 R |
| 7,394,037 | B2 | * | 7/2008 | Lewison | ..................... 200/336 |
| 2002/0112947 | A1 | * | 8/2002 | Shibata et al. | ........... 200/61.54 |
| 2004/0173444 | A1 | * | 9/2004 | Leng | ....................... 200/61.54 |

FOREIGN PATENT DOCUMENTS

| DE | 100 43 096 A1 | 3/2002 |
|---|---|---|
| EP | 0 366 132 A2 | 5/1990 |
| EP | 0 926 024 A2 | 6/1999 |
| EP | 1 551 046 A2 | 7/2005 |
| EP | 1 551 047 A2 | 7/2005 |

* cited by examiner

*Primary Examiner*—Michael A Friedhofer
*Assistant Examiner*—Lisa N Klaus
(74) *Attorney, Agent, or Firm*—Muncy, Geissler, Olds & Lowe, PLLC

(57) ABSTRACT

An operating element with wake-up functionality for a motor vehicle is provided, wherein a setting of an operating element can be selected by means of a translationally and/or rotationally movable grip, having at least one wiper contact track divided into sectors, having a wiper contact connected directly or indirectly to the grip, wherein the wiper contact is movable over the at least one wiper contact track by means of the grip, having an electronic analysis unit that can be switched off, and having at least one switching means connected to the wake-up electronics unit by means of which the electronic analysis unit of the operating element can be activated, wherein the switching means can be actuated by means of the grip.

9 Claims, 2 Drawing Sheets

OPERATING ELEMENT WITH WAKE-UP FUNCTIONALITY

This nonprovisional application is a continuation of International Application No. PCT/EP2006/007046, which was filed on Jul. 18, 2006, and which claims priority to German Patent Application Nos. DE 102005033984 and DE 102005055305, which were filed in Germany on Jul. 21, 2005 and Nov. 21, 2005, respectively, and which are both herein incorporated by reference.

BACKGROUND OF THE INVENTION

1. Field of the Invention

The present invention relates to an operating element with wake-up functionality for a motor vehicle, wherein the setting of the operating element can be selected by a translationally and/or rotationally movable grip, having at least one wiper contact track divided into sectors, a wiper contact directly or indirectly connected to the grip, and an electronic analysis unit that can be switched off.

2. Description of the Background Art

In modern motor vehicles, load current for a consumer, for example a lighting means, is not directly switched by operating elements. Instead, a control signal is generated, on the basis of which the actual switching process takes place, for example using a relay. The setting of the operating element can be selected by means of a translationally and/or rotationally movable grip, as is known for rotary switches for the headlights of a motor vehicle, for example. To this end, an operating element has a wiper contact track over which a wiper contact is moved by means of the grip. As a function of the setting of the grip, the wiper contact is located in a particular sector of the wiper contact track, thus establishing a contact that is detected by an electronic analysis unit. The electronic analysis unit then triggers the execution of the selected functionality. Further, it is known to connect an operating element to a data bus of the motor vehicle. The operating element has an appropriate bus electronics unit for this purpose. A disadvantage of such operating elements is that the analysis electronics unit or bus electronics unit has high power consumption.

It is known to place an electronics unit in what is called a sleep mode, in which the electronics unit is partially or completely switched off, in order to save energy. The electronics unit is awakened from this mode when needed.

SUMMARY OF THE INVENTION

It is therefore an object of the present invention to provide an operating element that provides an automatic wake-up functionality by means of which the analysis electronics unit or bus electronics unit can be automatically activated from the sleep mode.

In an embodiment of the operating element with wake-up functionality for a motor vehicle, the setting of the operating element can be selected by means of a translationally and/or rotationally movable grip. The operating element has at least one wiper contact track divided into sectors, a wiper contact directly or indirectly connected to the grip, an electronic analysis unit that can be switched off, which is to say can be placed into a sleep mode, and at least one switching means connected to the wake-up electronics unit. In this connection, the wiper contact can be moved over the at least one wiper contact track by means of the grip. The switching means can be actuated by the grip, and the electronic analysis unit can be activated by means of the switching means. In this connection, the term electronic analysis unit includes not only the electronics for sensing the switch position of the operating element, but also any bus electronics that may be present through which the operating element is connected to a data bus of the motor vehicle.

The essence of the invention is to close an additional contact, at least briefly, with the aid of the switching means when the grip is moved from one setting to another. This contact is detected by a wake-up electronics unit, which then activates the electronic analysis unit of the operating element. Because the wake-up electronics unit has significantly lower power consumption than the electronic analysis unit, the result is considerable energy savings. For example, the electronic analysis unit is automatically placed in the sleep mode after a specific period of time during which the operating element is not actuated.

In an embodiment, a switching means includes a wiper contact area, wherein the wiper contact of the operating element can be moved over at least one wiper contact area by means of the grip. The advantage of this variant is that the switching means is simple and inexpensive to produce, since it is only necessary to produce additional wiper contact areas along with the contact areas that are already present. No additional work steps or tools are necessary in producing the switching means.

In one embodiment of the invention, the wiper contact areas are located between the sectors of the wiper contact track. Alternatively or in addition, at least one sector of the wiper contact track is designed as a wiper contact area and is connected to the wake-up electronics unit. This ensures that the wiper contact automatically passes across the wiper contact area when moving from one sector of the wiper contact track to another.

In one embodiment, the wiper contact areas are arranged parallel and/or concentric to the wiper contact track. This permits any desired positioning of the additional wiper contact areas.

As an alternative to designing a switching means as a wiper contact area, the switching means can include a switch. Here, the switch is arranged in the operating element such that it is actuated when the grip is moved from one switch position to another. For example, the actuation takes place mechanically through the grip, a shaft that may be present in the operating element, or the wiper contact. Because of the preferred use of a zero-force switch, the haptics of the operating element are not affected by the switching means.

In another embodiment, the electronic analysis unit and the wake-up electronics unit are combined in one circuit. This is, for example, a microprocessor that performs both functions and is capable of placing a subsection in a quiescent mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
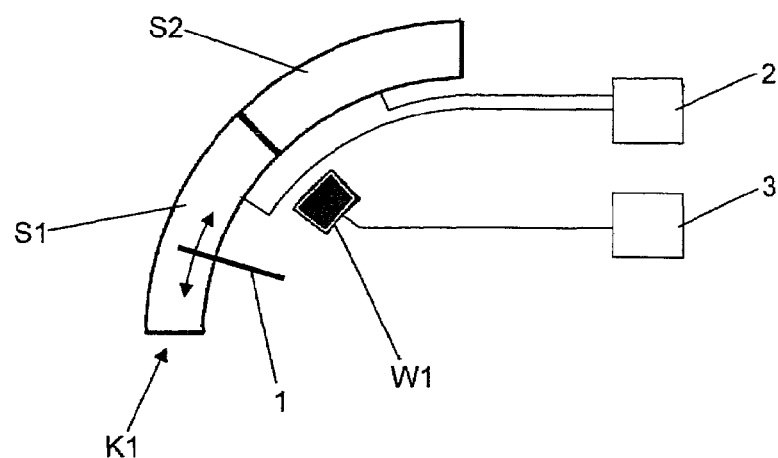
FIG. 1 is a design of a curved wiper contact track in an operating element.

FIG. 1 shows a schematic representation of a curved wiper contact track K1 in an inventive operating element. The wiper contact track K1 is divided into the two sectors S1 and S2. A wiper contact area W1 is arranged concentric to the wiper contact track K1. The two sectors S1 and S2 are electrically connected to an electronic analysis unit 2. An electrical connection exists from the wiper contact area W1 to a wake-up electronics unit 3. The wiper contact 1, which is electrically connected to the vehicle ground, can be rotated in the direction of the double arrow by means of a grip. Thus, a connection can be established between the appropriate input of the electronic analysis unit 2 and the vehicle ground through the sectors S1 and S2. When the wiper contact 1, which is preferably designed as a wiper, is moved from sector S1 to sector S2, it passes across the wiper contact area W1, pulling the input of the wake-up electronics unit 3 to ground in the process. The wake-up electronics unit 3 detects this edge transition and activates the electronic analysis unit 2, which was previously in sleep mode. The electronic analysis unit detects the setting of the wiper contact 1 and provides this information to the motor vehicle electronics.

Figure 2:
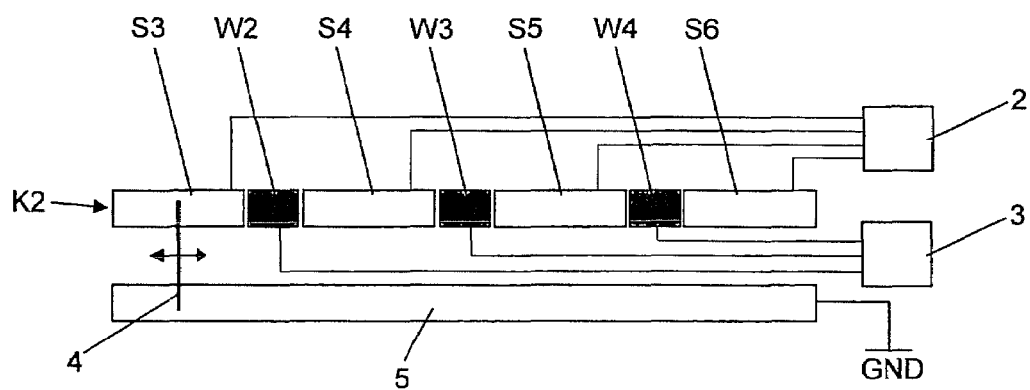
FIG. 2 is a design of a straight wiper contact track in an operating element.

FIG. 2 schematically shows a wiper contact track K2 that includes sectors S3, S4, S5 and S6. Located between each pair of adjacent sectors are wiper contact areas W2, W3 and W4. The sectors S3, S4, S5 and S6 are each electrically connected to inputs of the electronic analysis unit 2. The wiper contact areas W2, W3 and W4 are each electrically connected to inputs of the wake-up electronics unit 3. Also shown is a ground contact track 5 connected to ground. A wiper contact 4 is movably arranged on this ground contact track 5 and the wiper contact track K2; this wiper contact establishes an electrical contact between the ground contact track 5 and the wiper contact track K2.

When the wiper contact 4 is moved from the position shown in FIG. 2—where it electrically connects the sector S3 to the ground contact track 5 and thus pulls it to ground—so as to connect the sector S4 of the wiper contact track K2 to the ground contact track 5, it passes across the wiper contact area W2 in the process and briefly establishes an electrical connection between the wiper contact area W2 and the ground contact track 5. In this process, the wiper contact area W2, and thus the corresponding input of the wake-up electronics unit 3, is pulled to ground. This is detected by the wake-up electronics unit 3, which thereupon activates the electronic analysis unit 2, which was previously in sleep mode.

Figure 3:
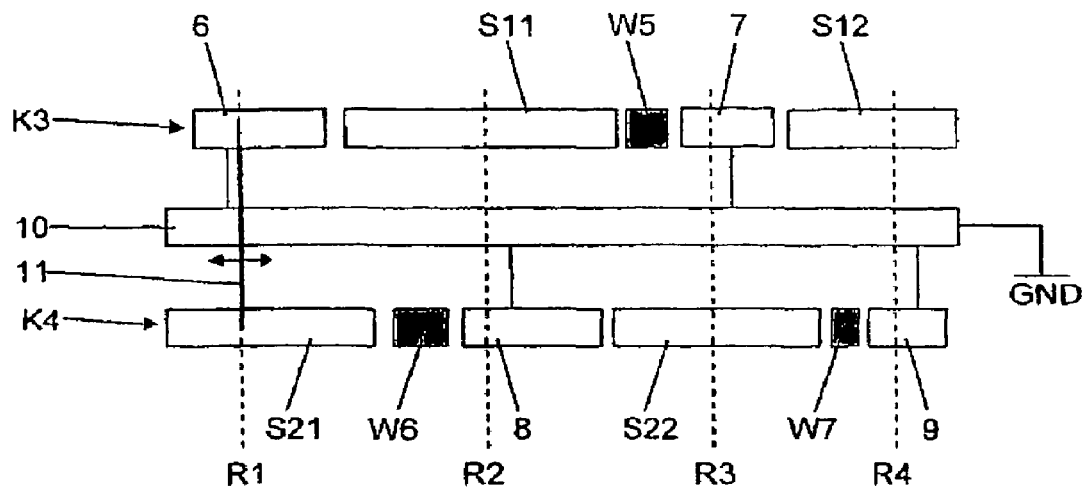
FIG. 3 is a design of two straight wiper contact tracks in an operating element.

FIG. 3 schematically shows an arrangement of two wiper contact tracks K3 and K4 and the wiper contact areas W5, W6 and W7 in an operating element. For reasons of clarity, FIG. 3 does not show the electronic analysis unit or the wake-up electronics unit with the associated connections to the wiper contact tracks K3 and K4 and wiper contact areas W5, W6 and W7.

The wiper contact tracks K3 and K4 are located on opposite sides of the ground contact track 10, which is connected to the vehicle ground; any other arrangement desired is also possible in this regard. The wiper contact track K3 includes the sectors S11 and S12. Located between or adjacent to the sectors S11 and S12 are the wiper contact area W5 and two additional contact areas 6 and 7, which are electrically connected to the ground contact track 10 and thus to the vehicle ground. The wiper contact track K4 includes the sectors S21 and S22. Located between or adjacent to the sectors S21 and S22 are the wiper contact areas W6 and W7 and the contact areas 8 and 9 which, like the contact areas 6 and 7, are electrically connected to the ground contact track 10. A wiper contact 11 is translationally movable in the direction of the double arrow by means of a grip that is not shown, and connects the ground contact track 10 to the wiper contact tracks K3 and K4. The grip of the operating element is preferably capable of clicking into four positions corresponding to the detent positions R1, R2, R3 and R4 of the wiper contact 11 that are indicated by dashed lines. In these detent positions, the wiper contact is in contact with one of the contact areas 6, 7, 8 or 9. The contact areas 6, 7, 8 and 9 are provided in order to optionally provide a redundant electrical connection between the wiper contact 11 and the vehicle ground together with the connection through the ground contact track 10. They also protect the substrate material carrying the contact areas against wear from the wiper contact.

In the position R1 shown in FIG. 3, the wiper contact 11 connects the ground contact track 10 and the contact area 6 to the sector S21 of the wiper contact track K4. The electronic analysis unit, which is not shown, detects this contact and performs a corresponding function. If the wiper contact 11 is moved to the right from the detent position R1 to the next detent position R2, where it connects the contact area 8 and the ground contact track 10 to the sector S11 of the wiper contact track K3, it passes across the wiper contact area W6 and briefly connects the input of the wake-up electronics (not shown), which is connected to the wiper contact area W6, to the vehicle ground through the ground contact track 10. The wake-up electronics unit detects this edge transition at the input and activates the electronic analysis unit, which was previously in sleep mode. The electronic analysis unit then detects that the wiper contact 11 connects the sector S11 to the vehicle ground and triggers a corresponding function. The movement of the wiper contact 11 into the detent positions R3 and R4, where it connects the sector S22 or S12 to the ground contact track 10 and the contact area 7 or 9, takes place in an analogous fashion.

The advantage of the arrangement with two or more wiper contact tracks, such as is shown in FIG. 3, is that it is possible to determine, through the design of the sectors of the wiper contact track, whether a hard transition between the sectors takes place or whether multiple sectors can be connected to the vehicle ground at the same time. In this way two functions can be activated during the transition, for example parking lights and driving lights. The wiper contact tracks can also have a curved design.

Figure 4:
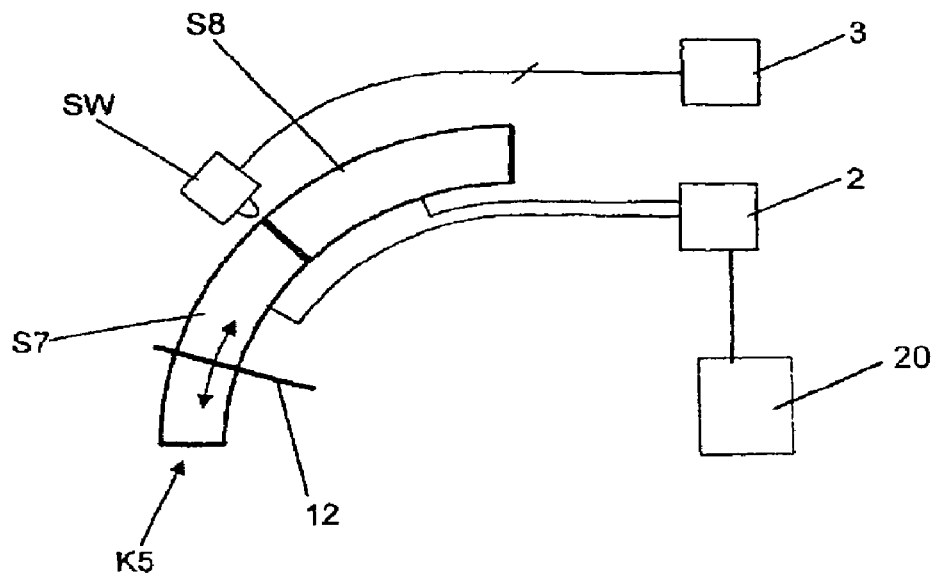
FIG. 4 is an alternative design of a curved wiper contact track in an operating element.

FIG. 4 shows a variation of the wiper contact track from FIG. 1. The wiper contact track K5 is divided into two sectors S7 and S8 and is connected to an electronic analysis unit 2. A wiper contact in the form of a wiper 12 connected to the vehicle ground is movable over the wiper contact track K5 in the direction of the double arrow. In contrast to FIG. 1, however, the switching means does not include the wiper contact area W1 that is passed across by the wiper 1, but instead has a zero-force switch SW. When the wiper 12 is moved out of sector S7 into sector S8, it actuates the switch SW. This actuation is detected by the wake-up electronics unit that is connected to the switch SW, whereupon the wake-up electronics unit wakes the electronic analysis unit 2 from the sleep mode.

Alternatively to the above descriptions, it is possible for the wiper contact 1 in FIG. 1, the wiper contact 12 in FIG. 4, or the ground contact tracks 5 and 10 in FIGS. 2 and 3 to be connected to an input or output of the electronic analysis unit instead of to the vehicle ground. The same applies to the wiper contact areas W1 through W7.

If the operating element is connected to a data bus 20, for example a LIN bus (Local Interchange Bus), the bus electronics are preferably placed in the sleep mode, and reactivated out of it, together with the electronic analysis unit 2. In a special embodiment, the electronic analysis unit and/or the bus electronics and/or the wake-up electronics unit are combined in one circuit. This circuit can be formed largely of a microcontroller or another suitable component.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An operating element with wake-up functionality for a motor vehicle, wherein setting of the operating element is selected by a translationally and/or rotationally movable grip comprising:
    at least one wiper contact track divided into sectors;
    a wiper contact connected directly or indirectly to the grip, the wiper contact being movable over the at least one wiper contact track via the grip;
    an electronic analysis unit that is configured to be switched off; and
    at least one switching device connected to a wake-up electronics unit via which the electronic analysis unit of the operating element is activated,
    wherein the switching device is actuated via the grip.

2. The operating element according to claim 1, wherein the switching device includes a wiper contact area, and wherein the wiper contact of the operating element is movable over at least one wiper contact area via the grip.

3. The operating element according to claim 2, wherein the wiper contact areas are arranged parallel and/or concentric to the wiper contact track.

4. The operating element according to claim 1, wherein the wiper contact areas are located between the sectors of the wiper contact track.

5. The operating element according to claim 1, wherein at least one sector of the wiper contact track is designed as a wiper contact area and is connected to the wake-up electronics unit.

6. The operating element according to claim 1, wherein the electronic analysis unit and the wake-up electronics unit are combined in one circuit.

7. The operating element according to claim 1, wherein the switching device is a switch.

8. The operating element according to claim 7, wherein the switch is a zero-force switch.

9. The operating element according to claim 1, further comprising a bus electronics unit for connecting the operating element to a data bus.

* * * * *